United States Patent
Yao

(10) Patent No.: US 12,451,028 B2
(45) Date of Patent: Oct. 21, 2025

(54) INFLATABLE HIP MODEL

(71) Applicant: Jiangsu Comco Outdoor Products Co., Ltd., Huaian (CN)

(72) Inventor: Liang Yao, Huaian (CN)

(73) Assignee: Jiangsu Comco Outdoor Products Co., Ltd., Huaian (CN)

( * ) Notice: Subject to any disclaimer, the term of this patent is extended or adjusted under 35 U.S.C. 154(b) by 515 days.

(21) Appl. No.: 18/097,294

(22) Filed: Jan. 16, 2023

(65) Prior Publication Data
US 2024/0242628 A1   Jul. 18, 2024

(51) Int. Cl.
  G09B 23/00   (2006.01)
  A63H 3/06   (2006.01)
  G09B 23/30   (2006.01)
  A63H 3/00   (2006.01)
(52) U.S. Cl.
  CPC ............... G09B 23/30 (2013.01); A63H 3/06 (2013.01); A63H 3/00 (2013.01)
(58) Field of Classification Search
  None
  See application file for complete search history.

(56) References Cited

U.S. PATENT DOCUMENTS

| 3,472,434 A | * | 10/1969 | Cherry | ..................... A41H 5/02 223/67 |
| 3,801,403 A | * | 4/1974 | Lucek | ...................... A47C 4/54 264/572 |
| 2016/0042667 A1 | * | 2/2016 | Kusafuka | ............ G01M 17/007 434/365 |

FOREIGN PATENT DOCUMENTS

CA    2526765 A1 *  5/2006  ............. G09B 25/00

\* cited by examiner

*Primary Examiner* — James B Hull
(74) *Attorney, Agent, or Firm* — Bayramoglu Law Offices LLC

(57) ABSTRACT

An inflatable hip model includes an inflatable body with a hip shape. The inflatable body is internally provided with a pull strap, the pull strap at least including two first ends and a second end. The pull strap is connected to the inflatable body through the two first ends respectively to form a first connecting portion. The pull strap is connected to the inflatable body through the second end to form a second connecting portion. The pull strap is used for acting on the inflatable body, so that the inflatable body in an inflated state forms concave regions at the first connecting portion and the second connecting portion. A center front sheet is formed in the region between the two connecting portions of the inflatable body, and a hip seam portion is formed at the second connecting portion.

14 Claims, 3 Drawing Sheets

INFLATABLE HIP MODEL

TECHNICAL FIELD

The present invention relates to the field of inflatable human models, and particularly to an inflatable hip model.

BACKGROUND

Existing human models are often made of hard materials such as plastics. The hard materials are easily processed and formed attractively. However, there is a problem of relatively high manufacturing cost.

At present, an inflatable model is also used and is inflated to form a model. The material of the inflatable model is usually soft. Particularly, the appearance shown by a film inflatable model which is inflated is either wizened or swollen, so that a concave-convex curve of a human body cannot be simulated. Therefore, this kind of model is usually used for exhibiting a cartoon figure without curve requirements and cannot replace the aforementioned plastic material to simulate the human body truly. The concave-convex curve of a hip region of the human body is more complicated and is more difficult to simulate.

Although the manufacturing cost of the inflatable model is relatively low, how to achieve the concave-convex curve required by the human hip truly for the film inflatable model is still a problem difficult to solve now.

SUMMARY

In order to solve the above-mentioned technical problems, the present invention provides an inflatable hip model, which uses an upper sheet, a lower sheet and the pull strap. By designing the pull strap, the inflated model is full in shape, has a concave-convex curve, is not shriveled and bloated and can achieve an effect of truly simulating a human hip.

The technical solution adopted by the present invention to solve the technical problems is s follows: an inflatable hip model includes an inflatable body with a hip shape. The inflatable body is internally provided with a pull strap, the pull strap at least including two first ends and a second end. The pull strap is connected to the inflatable body through the two first ends respectively to form a first connecting portion. The pull strap is connected to the inflatable body through the second end to form a second connecting portion. The pull strap is used for acting on the inflatable body, so that the inflatable body in an inflated state forms concave regions at the first connecting portion and the second connecting portion. A center front sheet is formed in the region between the two connecting portions of the inflatable body, and a hip seam portion is formed at the second connecting portion.

Further, the pull strap includes two pull strap sheets forming a V-shaped structure, and the backward ends of the two pull strap sheets are connected as the second ends; and the frontward ends of the two pull strap sheets are taken as the first ends.

Further, the frontward end of each of the pull strap sheets has a first arc-shaped edge protruding towards the front side.

Further, the backward end of each of the pull strap sheets has a second arc-shaped edge protruding towards the back side.

Further, a channel where a gas passes through is reserved between each of the pull straps and the inflatable body.

Further, the inflatable body is provided with an inflation opening.

Further, the inflatable body includes a front sheet and back sheet connected to the front sheet; and the two first connecting portions are arranged on the front sheet, and the second connecting portion is arranged on the back sheet.

Further, in the inflatable body, the front sheet and the back sheet are connected through a top sheet in a top side region.

Further, the first connecting portions and the second connecting portion are melting portions.

The present invention has the following beneficial effects: an inflatable hip model provided by the present invention adopts the design of the upper sheet and the lower sheet, which forms the inflatable model with the appearance of the human hip; the center front sheet which simulates the lower abdomen of the human body is formed on the front side of the model by utilizing the pull strap; as being restricted by the pull strap, the center front sheet region of the inflated inflatable model bulges and the first connecting portions on both sides of the center front sheet region are sunken inwards to fit the inflatable body so as to simulate the lower abdomen and the groin region of the human body; moreover, the second connecting portion of the inflated inflatable model is sunken inwards to fit the inflatable body so as to simulate the hip shape of the human body; the inflated inflatable model restrained by the pull strap is full in shape, has the concave-convex curve, is not wizened and swollen, and can simulate the human hip truly; in addition, the arc-shaped designs of the first and second ends of the pull strap can better restrain the shape of the inflatable body, so that the inflated inflatable model is truer.

Figure 1:
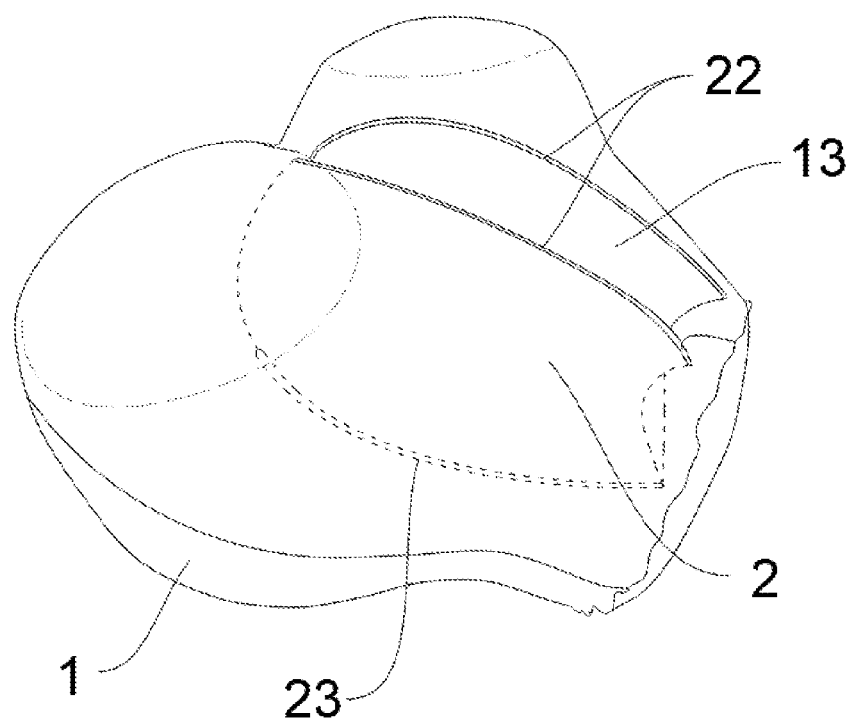
FIG. 1 is a three-dimensional schematic diagram of an inflatable hip model of the embodiment.

In the drawings, 1—inflatable body; 2—pull strap; 11—front sheet; 12—back sheet; 13—center front sheet; 14—top sheet; 21—pull strap sheet; 22—first connecting portion; 23—second connecting portion; 211—first arc-shaped edge; 212—second arc-shaped edge.

DETAILED DESCRIPTION OF THE EMBODIMENTS

In order to deepen understanding of the present invention, the present invention will be further described in detail below in combination of drawings and embodiment. The embodiment is merely used for explaining the present invention rather than limiting the protection scope of the present invention.

EMBODIMENT

Referring to FIG. 1 to FIG. 4, the present invention provides an inflatable hip model, including an inflatable body 1 with a hip shape, where the inflatable body is internally provided with a pull strap 2, the pull strap 2 at least including two first ends and a second end; the pull strap is connected to the inflatable body 1 through the two first ends respectively to form a first connecting portion 22; the pull strap is connected to the inflatable body 1 through the second end to form a second connecting portion 23; the pull strap 2 is used for acting on the inflatable body 1, so that the inflatable body 1 in an inflated state forms concave regions at the first connecting portion 22 and the second connecting portion 23; and a center front sheet 13 is formed in the region between the two connecting portions 22 of the inflatable body 1, and a hip seam portion is formed at the second connecting portion 23.

The inflatable hip model provided by the present invention adopts the design of the upper sheet and the lower sheet, which forms the inflatable model with the appearance of the human hip by using a film material; the center front sheet which simulates the lower abdomen of the human body is formed on the front side of the model by utilizing the pull strap; as being restricted by the pull strap, the center front sheet region of the inflated inflatable model bulges and the first connecting portions on both sides of the center front sheet region are sunken inwards to fit the inflatable body so as to simulate the lower abdomen and the groin region of the human body; moreover, the second connecting portion of the inflated inflatable model is sunken inwards to fit the inflatable body so as to simulate the hip shape of the human body.

Figure 2:
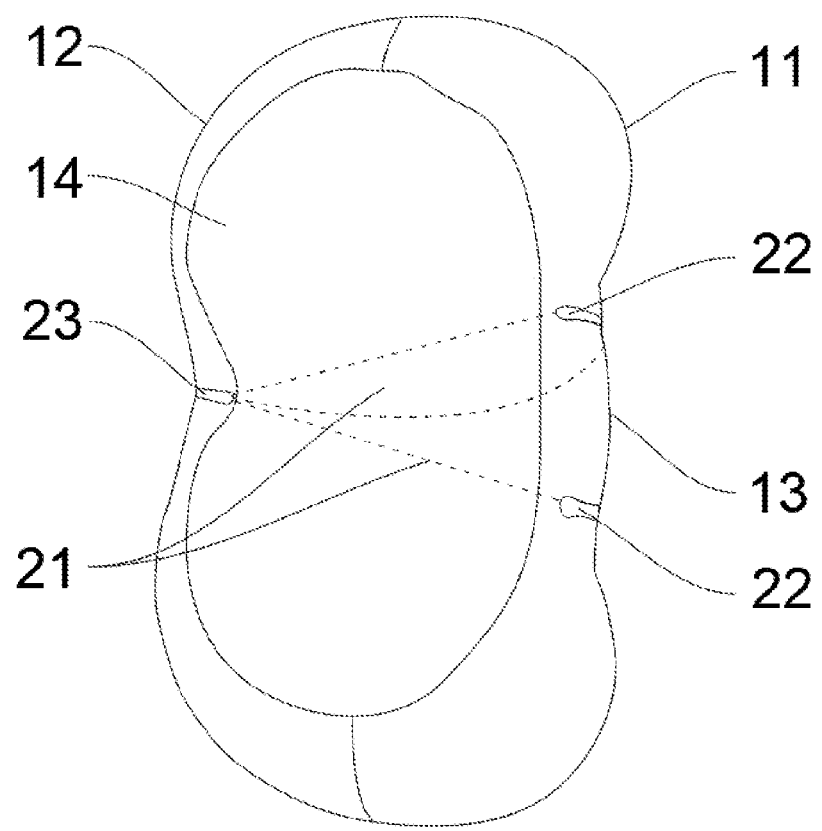
FIG. 2 is a three-dimensional schematic diagram of an inflatable hip model of the embodiment at an overhead angle.
Figure 3:
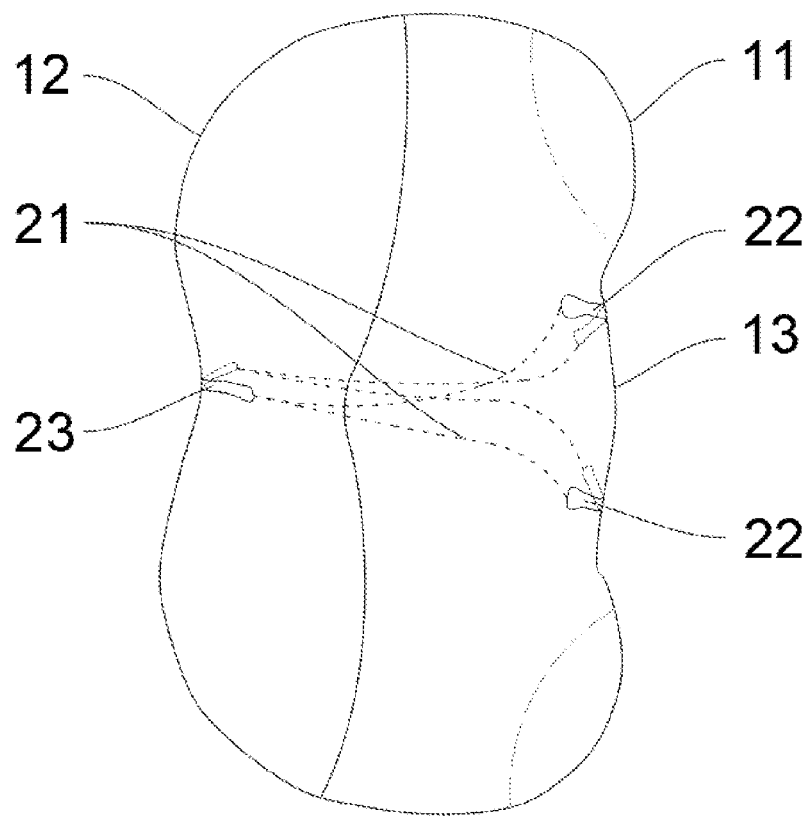
FIG. 3 is a three-dimensional schematic diagram of an inflatable hip model of the embodiment at an elevation angle.

Further referring to FIG. 2 and FIG. 3, the pull strap 2 includes two pull strap sheets 21 forming a V-shaped structure, and the backward ends of the two pull strap sheets 21 are connected as the second ends; and the frontward ends of the two pull strap sheets 21 are taken as the first ends.

Figure 4:
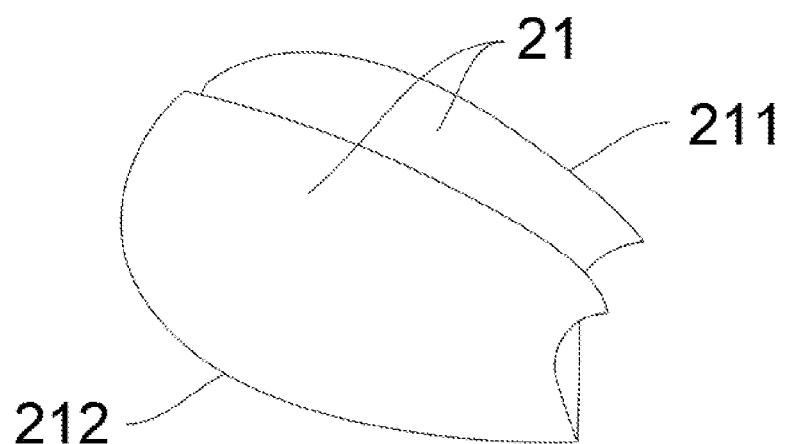
FIG. 4 is a three-dimensional schematic diagram of a pull strap of an inflatable hip model of the embodiment.

Further referring to FIG. 4, the frontward end of each of the pull strap sheets 21 has a first arc-shaped edge 211 protruding towards the front side, and the backward end of each of the pull strap sheets 21 has a second arc-shaped edge 212 protruding towards the back side. As the region where the pull strap sheets and the inflatable body 1 are connected will be restrained by the pull strap 2 after the inflatable body 1 is inflated and the first arc-shaped edge and the second arc-shaped edge of each of the pull strap sheets 21 can better restrain the shape of the inflatable body 1 in the corresponding regions. Matched with the shape of the inflatable body 1 which is inflatable fully, the effect of simulating the human hip more truly.

Further referring to FIG. 1 to FIG. 3, a channel where a gas passes through is reserved between the pull strap 2 and the inflatable body 1, and the inflatable body 1 is provided with an inflation opening (not shown in the drawings). In the present invention, the pull strap 2 does not divide the inflatable body 1 into independent spaces. The entire inflatable model can be inflated at one time through the inflation opening with uniform air pressure, so that the shape can be better exhibited.

Further referring to FIG. 2 and FIG. 3, the inflatable body 1 includes a front sheet 11 and back sheet 12 connected to the front sheet 11; and the two first connecting portions 22 are arranged on the front sheet 11, and the second connecting portion 23 is arranged on the back sheet 12. In the embodiment, the front sheet and the back sheet are connected together by way of melting, and a melting portion is formed at the connection of the front sheet and the back sheet. Of course, the first connecting portions 22 and the second connecting portion 23 can be melting portions formed by being connected by way of melting.

Further referring to FIG. 2, in the inflatable body 1, the front sheet 11 and the back sheet 12 are connected through a top sheet 14 in a top side region. In the embodiment, the bottom side region of the hip of the inflatable body can be designed as arc-shaped transition, the front sheet and the back sheet can be directly connected here, and the appearance of the inflated inflatable model is true and attractive. It is needed to design a relatively large plane on the side of the inflatable body close to the waist. By designing the top sheet 14, attractiveness of the part can be guaranteed.

The embodiment shall not limit the present invention in any way. Technical solutions obtained by way of equivalent replacement or equivalent conversion shall fall into the protection scope of the present invention.

What is claimed is:

1. An inflatable hip model, comprising an inflatable body with a hip shape, wherein the inflatable body is internally provided with a pull strap, the pull strap at least comprises two first ends and a second end;
   the pull strap is connected to the inflatable body through the two first ends respectively to form a first connecting portion;
   the pull strap is connected to the inflatable body through the second end to form a second connecting portion;
   the pull strap is configured for acting on the inflatable body, wherein the inflatable body in an inflated state forms concave regions at the first connecting portion and the second connecting portion; and
   a center front sheet is formed in a region between the first and second connecting portions of the inflatable body, and a hip seam portion is formed at the second connecting portion.

2. The inflatable hip model according to claim 1, wherein the pull strap comprises two pull strap sheets forming a V-shaped structure, and backward ends of the two pull strap sheets are connected as the second ends; and frontward ends of the two pull strap sheets are taken as the two first ends.

3. The inflatable hip model according to claim 2, wherein the frontward end of each of the two pull strap sheets has a first arc-shaped edge protruding towards a front side.

4. The inflatable hip model according to claim 3, wherein the backward end of each of the two pull strap sheets has a second arc-shaped edge protruding towards a back side.

5. The inflatable hip model according to claim 1, wherein a channel where a gas passes through is reserved between each of the pull straps and the inflatable body.

6. The inflatable hip model according to claim 1, wherein the inflatable body is provided with an inflation opening.

7. The inflatable hip model according to claim 1, wherein the inflatable body comprises a front sheet and a back sheet connected to the front sheet; and the two first connecting portions are arranged on the front sheet, and the second connecting portion is arranged on the back sheet.

8. The inflatable hip model according to claim 7, wherein in the inflatable body, the front sheet and the back sheet are connected through a top sheet in a top side region.

9. The inflatable hip model according to claim 7, wherein the two first connecting portions and the second connecting portion are melting portions.

10. The inflatable hip model according to claim 2, wherein the inflatable body comprises a front sheet and a back sheet connected to the front sheet; and the two first connecting portions are arranged on the front sheet, and the second connecting portion is arranged on the back sheet.

11. The inflatable hip model according to claim 3, wherein the inflatable body comprises a front sheet and a back sheet connected to the front sheet; and the two first connecting portions are arranged on the front sheet, and the second connecting portion is arranged on the back sheet.

12. The inflatable hip model according to claim 4, wherein the inflatable body comprises a front sheet and a back sheet connected to the front sheet; and the two first connecting portions are arranged on the front sheet, and the second connecting portion is arranged on the back sheet.

13. The inflatable hip model according to claim 5, wherein the inflatable body comprises a front sheet and a back sheet connected to the front sheet; and the two first connecting portions are arranged on the front sheet, and the second connecting portion is arranged on the back sheet.

14. The inflatable hip model according to claim 6, wherein the inflatable body comprises a front sheet and a back sheet connected to the front sheet; and the two first connecting portions are arranged on the front sheet, and the second connecting portion is arranged on the back sheet.

\* \* \* \* \*